United States Patent [19]

Ashby

[11] Patent Number: 4,496,68(

[45] Date of Patent: Jan. 29, 198.

[54] SILICONE FLAME RETARDANTS FOR NYLON

[75] Inventor: Bruce A. Ashby, Schenectady, N.Y.

[73] Assignee: General Electric Company, NY, N.Y.

[21] Appl. No.: 589,293

[22] Filed: Mar. 14, 1984

[51] Int. Cl.$^3$ .............................................. C08L 77/00
[52] U.S. Cl. .................................. 524/265; 252/609; 427/385.5; 524/266
[58] Field of Search ............................. 524/265, 266; 427/385.5; 252/609

[56] References Cited

U.S. PATENT DOCUMENTS

| | | | |
|---|---|---|---|
| 3,419,517 | 12/1968 | Hedrick et al. | 524/493 |
| 4,247,446 | 1/1981 | Betts et al. | 260/42.42 |
| 4,273,691 | 6/1981 | MacLaury et al. | 260/235 |
| 4,387,176 | 6/1983 | Frye | 524/268 |

FOREIGN PATENT DOCUMENTS 57-76039  5/1982  Japan .

Primary Examiner—Maurice J. Welsh
Attorney, Agent, or Firm—Gary L. Loser

[57] ABSTRACT

There is provided a flame retardant composition com prising:

(a) about 50 to about 90 percent by weight of one c more nylon materials, and
(b) about 10 to about 50 percent by weight of a compos tion effective for imparting flame resistance compri: ing:
 (i) about 20 to about 75 percent by weight based o (b) of diphenylsilanediol, low molecular weigh phenyl substituted siloxane diol, or mixture thereo
 (ii) about 3 to about 30 percent by weight based on (t of Group IIA metal carboxylic acid salt;
 (iii) about 10 to about 60 percent by weight based o (b) of aluminum trihydrate; and
 (iv) about 10 to about 50 percent by weight based o (b) of organic halide.

43 Claims, No Drawings

SILICONE FLAME RETARDANTS FOR NYLON

BACKGROUND OF THE INVENTION

The present invention relates to flame retardant compositions. More particularly, the present invention relates to flame retardant nylon plastic compositions and additive compositions which render nylon plastics substantially flame resistant.

Nylon is the generic name for a family of polyamide polymers characterized by the presence of the amide group. The more common types of polyamide or nylon plastics are nylon-6, nylon-6,6, nylon-6,10, nylon-11 and nylon-12.

The nomenclature commonly employed in naming nylons is simply to designate the number of carbons in the repeating units; for example, the polyamide made from caprolactam, which contains six carbons, is known as nylon-6. If aminoundecanoic acid were instead employed, such monomer containing 11 carbon atoms, the resulting polyamide would be designated nylon-11. The reaction between hexamethylenediamine and adipic acid produces nylon-6,6 and, similarly the reaction between sebacic acid and hexamethylenediamine produces nylon-6,10.

The manufacturing process of a particular polyamide is dependent upon the type of polymer being made. Polymerization of lactams, for example, requires opening of the ring structure, followed by linear chain growth. Polymers formed by reaction of amines and acids are produced by polycondensation, with formation of water.

Polyamides that can be processed as solutions can be produced in the form of copolyamides based on combinations of nylon-6,6, nylon-6 and nylon-6,10. These materials have good oil resistance, abrasion resistance and adhesive qualities.

Furthermore, special grades of nylon have been developed for processing as powders. In this case the most success has been achieved with nylon-11, since it possesses a relatively low melting point of 185° C., has low moisture absorption and good chemical resistance.

One shortcoming of all of the foregoing nylon compositions is that they are not very flame resistant under the UL-94 V rating system which, briefly, is as follows:

"UL-94 V-O":
Average flaming and/or glowing after removal of the igniting flame shall not exceed five seconds and none of the specimens shall drip particles which ignite absorbent cotton.

"UL-94 V-I":
Average flaming and/or glowing after removal of the igniting flame shall not exceed 25 seconds and none of the specimens shall drip particles which ignite absorbent cotton.

"UL-94 V-II":
Average flaming and/or glowing after removal of the igniting flame shall not exceed 25 seconds and the specimens drip flaming particles which ignite absorbent cotton.

Japanese Kokai, JP 82/76,039, discloses fire resistant polyolefin compounds which contain 1–50% (based on the polyolefin) of the reaction product of a silane or siloxane having two or more halogen or hydroxyl groups with a boron-containing compound, with or without additional silicone oil. Thus, for example, diphenylsilanediol, boric acid and polydimethylsiloxane oil can be reacted to provide a borosiloxane effective for rendering a low density polyethylene substantia flame resistant.

U.S. Pat. No. 4,247,246 to Betts et al. discloses a fla resistant composition comprised of a crosslinked olef decabromodiphenyl ether, silicone gum and dibasic le phthalate.

In U.S. Pat. No. 4,273,691, MacLaury et al., there disclosed a flame resistant composition comprised o blend of organic polymer, silicone polymer, and Group IIA metal carboxylate salt containing six twenty carbon atoms. Copending patent applicati Ser. No. 344,167, filed Jan. 29, 1982 (Frye et al.), c closes flame retardant compositions similar to N cLaury et al. but utilize silicone polymers having s stantially lower viscosities.

Frye discloses in U.S. Pat. No. 4,387,176, that i proved flame retardant or flame resistant thermoplast are provided by adding thereto a silicone, a silico resin which is soluble in said silicone and a Group I metal organic salt containing 6 or more carbon ator Included among the organic polymers which can used to make the flame resistant compositions of Fi are polyamides such as nylon-6,6 and nylon-12 e Although Frye does provide excellent results in tl nylon plastic improves from totally consumed by flan in only 175 seconds to a UL-94 rating of V-II, it is ne ertheless desirable to provide nylon compositic which have a UL-94 of V-O or V-I.

Each of the foregoing disclosures are incorporated reference into the instant disclosure.

It should be noted that the terms "flame resistar and "flame retardant" are used interchangeal throughout and are intended to have the same meanii i.e. having a UL-94 rating or V-O or V-I.

SUMMARY OF THE INVENTION

It is one object of the present invention to provi nylon compositions which exhibit improved flame res tance or retardance.

It is another object of the present invention to pi vide novel flame retardant additives for use in renderi nylon compositions substantially flame resistant.

Still another object of the present invention is provide processes for making the foregoing flame ret dant additives and flame retardant nylon compositio In accordance with the foregoing objects there provided by the present invention an additive packa or masterblend formulation effective for renderi nylon plastics substantially flame resistant when co bined therewith, comprising:
(i) 20 to 75 percent by weight of diphenylsilanedi 1,1,3,3-tetraphenyldisiloxanediol, 1,1,3,3,5,5-he: phenyltrisiloxanediol or mixtures thereof,
(ii) 3 to 30 percent by weight of a Group IIA me $C_{(6-20)}$ carboxylic acid salt,
(iii) 10 to 60 percent by weight aluminum trihydra and
(iv) 10 to 50 percent by weight decabromodiphenyl( ide.

In accordance with another aspect of the prese invention there is provided a substantially flame res tant nylon plastic composition comprising:
(i) 10 to 50 percent by weight of a flame retardant ad tive as hereinabove described, said flame retard: additive being substantially uniformly disper: throughout;

ii) 50 to 90 percent by weight of one or more nylon plastic compositions.

DESCRIPTION OF THE INVENTION

The present invention is based on the surprising discovery that 10 to 50 parts by weight of a composition comprising
i) 20 to 75 percent by weight of diphenylsilanediol, 1,1,3,3-tetraphenyldisiloxanediol, 1,1,3,3,5,5-hexaphenyltrisiloxanediol or mixtures thereof,
ii) 3 to 30 percent by weight of a Group IIA metal $C_{(6-20)}$ carboxylic acid salt,
iii) 10 to 60 percent by weight aluminum trihydrate, and
iv) 10 to 50 percent by weight decabromodiphenyloxide
can be mixed or blended with 50 to 90 percent by weight of a nylon plastic composition and thereby render said nylon composition substantially flame resistant.

The first major ingredient of the flame retardant additive of the present invention is preferably a compound selected from the group consisting of diphenylsilanediol, e.g.

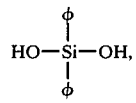

1,1,3,3-tetraphenyldisiloxanediol, e.g.

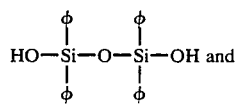

1,1,3,3,5,5-hexaphenyltrisiloxanediol, e.g.

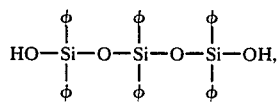

or mixtures thereof, where $\phi$ is phenyl. It is, of course, within the scope and spirit of the present invention to utilize other low molecular weight siloxanediols wherein all of the organo groups bonded to silicon are phenyl. Such siloxanediols can readily be determined without undue experimentation on the part of the artisan.

One of the primary purposes of such diol compounds is to eliminate flaming drops of nylon plastic which occur when the silane or siloxane diol is not included in the composition.

Broadly, there can be from about 20 to about 75 parts by weight of diol compound per 100 parts by weight of flame retardant additive composition. If less than 20 parts by weight of diol composition is utilized per 100 parts flame retardant additive the resulting nylon plastic composition will not have a UL-94 rating of V-O or V-I. If more than about 75 parts by weight of diol compound is employed there will be insufficient amounts of the other ingredients present to provide the nylon effective flame resistance.

The preferred diol for practicing the present invention is diphenylsilanediol as it is not only least expensive, but also, is the most effective.

In a preferred embodiment of the present invention there is present from about 25 to about 45 parts by weight of diol compound, and most preferably from about 25 to about 30 parts by weight of diol compound, per 100 parts by weight flame retardant composition.

The second ingredient of the masterbatch formulation or flame retardant additive package is a Group IIA metal $C_{(6-20)}$ carboxylic acid salt. Group IIA metal carboxylic acid salts containing at least six carbon atoms, as discussed by MacLaury et al., are particularly effective, and the most preferred Group IIA metal carboxylic acid salt is magnesium stearate.

The Group IIA metal carboxylic acid salt may be present in an amount ranging from about 3 to about 30 percent by weight. More preferably such compound is present in an amount ranging from about 5 to about 15 percent by weight and most preferably is present in an amount of from about 8 to about 12 percent by weight.

For further information relating to such Group IIA metal carboxylic acid salts, the reader is referred to the teaching of Frye, U.S. Pat. No. 4,387,176, which has been incorporated by reference into the instant disclosure.

The third ingredient of the flame retardant additive is aluminum trihydrate. Aluminum trihydrate is well known in the art as a flame retardant and hence it will not be discussed at length. Generally it may be present in the masterbatch of the present invention in amounts ranging from about 10 to about 60 percent by weight. In a preferred embodiment the aluminum trihydrate is present in an amount ranging from about 30 to about 45 percent by weight, and in the most preferred embodiment the aluminum trihydrate is present in an amount of about 35 to about 40 percent by weight.

The fourth and last essential ingredient of the flame retardant masterbatch of the present invention is an organic halide, most preferably decabromodiphenyl oxide, DBDPO. Other organic halides which are believed to be suitable for practicing the present invention are Dechlorane Plus (COD-di HEX); pentabromochlorocyclohexane (PBCCH); hexabromocyclododecane (HBCD); 2,3,4,5,6-pentabromoethylbenzene (PBEB); and 1,2-bis-(2,4,6-tribromophenoxy)ethane (BTBPE).

In its broadest aspects the organo halide, which preferably is decabromodiphenyl oxide, is present in an amount ranging from about 10 to about 50 percent by weight. In a more preferred embodiment such organic halide is present in an amount ranging from about 20 to about 35 percent by weight, and in the most preferred embodiment the organic halide, especially DBDPO, is present in an amount ranging from about 25 to about 30 percent by weight.

Masterbatch formulations within the scope of the present invention may, of course, contain other ingredients depending upon the end use of the nylon plastic intended by the artisan. Thus, the masterbatch blend may include various fillers such as talc, clay, calcium carbonate, fumed silica, wollastonite and the like. Other suitable fillers will be obvious to those skilled in the art.

Another optional ingredient which may be utilized in the flame retardant additive of the present invention is a class of materials referred to as silicone MQ resins. MQ resins are typically comprised of monofunctional (M) siloxy units of the formula $R_3SiO_{0.5}$ and tetrafunctional (Q) siloxy units of the formula $SiO_2$ and having a specified ratio of M to Q units. One effective silicone resin is polytrimethylsilylsilicate which can have a ratio of, approximately, 0.3 to 4.0 M units per Q unit. For further information relating to suitable silicone resins the reader is again referred to Frye, U.S. Pat. No. 4,387,176, which is incorporated herein by reference.

Other useful optional additives will be obvious to the skilled artisan which are intended to be included within the scope of the instant invention so long as they are used in combination with the four essential ingredients disclosed hereinabove.

In a second aspect of the present invention, a novel flame resistant nylon plastic composition is provided which comprises from about 10 to about 50 percent by weight of the foregoing flame retardant additive or masterbatch formulation and from about 50 to about 90 percent by weight of nylon material.

It is believed that the masterbatch formulation of the instant invention will be suitable for rendering any nylon material flame retardant, however, it is particularly preferred that such masterbatch be employed in combination with the nylon plastics identified as nylon-6, nylon-6,6, nylon-6,10, nylon-11 and nylon-12. More preferably the nylon plastic used to practice the present invention is nylon-6 or nylon-11 and most preferably it is nylon-11.

Preferably there is present from about 25 to about 45 percent by weight of masterbatch formulation and about 55 to 75 percent by weight of nylon material. Most preferably there is present from about 35 to about 40 percent by weight of masterbatch formulation and about 60 to about 65 percent by weight of nylon material.

Based on the foregoing, those skilled in the art will be able to adapt and optimize, without undue experimentation, the flame retardant compositions of the present invention.

In the practice of the present invention, the flame retardant additive or masterbatch formulation can be made by mixing together (i) diphenylsilane diol, a low molecular weight siloxane diol, or mixture thereof, (ii) a Group IIA metal carboxylic acid salt, (iii) aluminum trihydrate and (iv) an organic halide. Mixing may be effected by means of any conventional compounding or blending apparatus, such as for example, a Banbury mixer or a mixing extruder. The particular order of addition of the constituents does not appear to be critical and, in fact, all of the ingredients can be placed in the same container prior to mixing.

Of course, the flame resistant nylon plastic compositions of the present invention can be molded, extruded or the like, in accordance with methods well known to those skilled in the art.

In order that those skilled in the art will be better able to practice the invention, the following examples are given by way of illustration and not by way of limitation. All parts are by weight unless otherwise specified.

EXAMPLES

All samples were prepared by boiling in water for 2 hours and then equilibrating at ambient conditions for 2 days prior to testing.

EXAMPLE 1

A nylon material obtained from American Hoechst Corporation, designated as Grade 513 and described as nylon-6 (indicating that it was manufactured from caprolactam) was tested for Gardner Impact and flammability under UL-94 test conditions with the following results:

| | |
|---|---|
| Gardner Impact | 35 in-lbs. |
| UL-94, sec. | 175 (consumed). |

This shows that nylon-6 alone is not a flame resistant composition.

EXAMPLE 2

In this example, 125 parts nylon-6 was blended with 13.6 parts diphenylsilanediol, 7.0 parts of an MQ resin 6.8 parts magnesium stearate, 27.4 parts aluminum trihydrate, and 20.6 parts decabromodiphenyl oxide with the following results:

| | |
|---|---|
| Gardner Impact | 6 in.-lbs. |
| UL-94, sec. | 6.8 |
| rating | V-I |

This example illustrates an effective flame resistant nylon composition.

EXAMPLE 3

In this example a sample identical to that of Example 2 was prepared except that the MQ resin was excluded. The following results were obtained:

| | |
|---|---|
| Gardner Impact | 4 in.-lbs. |
| UL-94, sec. | 4.8 |
| rating | V-O |

This example also illustrates an effective nylon flame resistant composition and shows that the presence of MQ resin is not critical.

EXAMPLE 4

Again, there was utilized 125 parts nylon-6 as in Example 1 which were blended with 13.6 parts 1,1,3,3,5,5 hexaphenyldisiloxanediol, 7.0 parts MQ resin, 6.8 parts magnesium stearate, 27.4 parts aluminum trihydrate and 20.6 parts decabromodiphenyl oxide. The results were as follows:

| | |
|---|---|
| Gardner Impact | 8 in.-lbs. |
| UL-94, sec. | 11.4 |
| rating | V-I |

This example illustrates a successful flame resistant nylon composition which utilizes a low molecular weight siloxane diol in place of the diphenylsilanediol of Examples 2 and 3.

EXAMPLE 5

This example is identical to Example 4 except that an MQ resin is not included. The following results were obtained:

| | |
|---|---|
| Gardner Impact | 8 in.-lbs. |
| UL-94, sec. | 5.3 |
| rating | V-I |

This example also shows a nylon plastic composition having excellent flame resistance and, again, shows that an MQ resin is not an essential ingredient.

EXAMPLE 6

In this example 125 parts by weight nylon-11 (sold commercially as Rilsan grade BESNO-TL nylon-11) was tested for Gardner Impact, Notched Izod Impact, and flammability under UL-94 test conditions with the following results:

| | |
|---|---|
| Gardner Impact | 264/272 in-lbs. |
| Notched Izod Impact | 1.80 ft. lbs. per inch |
| UL-94, sec. | consumed |
| rating | — |

This example shows that nylon-11 is not a flame resistant composition.

EXAMPLE 7

In this example, 125 parts Rilsan grade BESNO-TL nylon material of the type employed in Example 6 was blended with the following masterbatch formulation prior to molding and testing for Gardner Impact, Notched Izod Impact, and flammability under UL-94 test conditions: 20.6 parts diphenylsilanediol, 6.8 parts magnesium stearate, 27.4 parts aluminum trihydrate, and 20.6 parts decabromodiphenyl oxide. The test results were as follows:

| | |
|---|---|
| Gardner Impact | 240/256 in.-lbs. |
| Notched Izod Impact | 2.40 ft. lbs. per inch |
| UL-94, sec. | 4.6 |
| rating | V-O |

This example shows that the flame retardant additive of the present invention is particularly effective with nylon-11 as not only does it result in a UL-94 rating of V-O, but also provides improved Notched Izod Impact resistance and comparable Gardner Impact results.

EXAMPLE 8

A commercially available flame resistant nylon-11 material sold by Rilsan Corp. as Grade RDG-68 was tested in the same manner as the flame retardant nylon-11 composition of Example 7 for comparative purposes with the following results:

| | |
|---|---|
| Gardner Impact | 160/168 in. lbs. |
| Notched Izod Impact | 0.96 ft. lbs. per in. |
| UL-94, sec. | 0.5 |
| rating | V-O |

This example illustrates a nylon-11 compound having a UL-94 V-O rating which extinguishes rapidly but which has inferior qualities with respect to Gardner Impact and Notched Izod Impact.

EXAMPLE 9

In order to show the importance of diphenylsilanediol or low molecular weight phenyl substituted siloxane diol, a composition was prepared as follows: 145.6 parts BESNO-TL nylon-11, 6.8 parts magnesium stearate, 27.4 parts aluminum trihydrate and 20.6 parts decabromodiphenyl oxide. This sample was only tested for flammability under UL-94 test conditions with the following results:

Compression Molded Sample 7.8 sec.
flaming drops

Injection Molded Sample 3.3 sec.
flaming drops

Each sample therefore received a UL-94 rating of V-II. This example thus shows that the effect of the diphenylsilanediol or low molecular weight phenyl substituted siloxane diol is to eliminate flaming drops.

I claim:

1. A flame retardant composition comprising:
   (a) about 50 to about 90 percent by weight of one or more nylon materials, and
   (b) about 10 to about 50 percent by weight of a composition effective for imparting flame resistance comprising:
       (i) about 20 to about 75 percent by weight based on (b) of diphenylsilanediol, low molecular weight phenyl substituted siloxane diol, or mixture thereof;
       (ii) about 3 to about 30 percent by weight based on (b) of Group IIA metal carboxylic acid salt;
       (iii) about 10 to about 60 percent by weight based on (b) of aluminum trihydrate; and
       (iv) about 10 to about 50 percent by weight based on (b) of organic halide.

2. A composition as in claim 1 wherein said nylon material is nylon-6, nylon-6,6, nylon-6,10, nylon-11, nylon-12 or mixture thereof.

3. A composition as in claim 1 wherein said nylon material is nylon-6, nylon-11, or mixture thereof.

4. A composition as in claim 1 wherein said nylon material is nylon-11.

5. A composition as in claim 1 wherein there is present about 55 to about 75 percent by weight of said one or more nylon materials and about 25 to about 45 percent by weight of said composition effective for imparting flame resistance.

6. A composition as in claim 1 wherein there is present about 60 to about 65 percent by weight of said one or more nylon materials and about 35 to about 40 percent by weight of said composition effective for imparting flame resistance.

7. A composition as in claims 1, 5 or 6 wherein said composition effective for imparting flame resistance comprises:
   (i) about 25 to about 45 percent by weight based on (b) of diphenylsilanediol, low molecular weight phenyl substituted siloxane diol or mixture thereof;
   (ii) about 5 to about 15 percent by weight based on (b) of Group IIA metal carboxylic acid salt;
   (iii) about 30 to about 45 percent by weight based on (b) of aluminum trihydrate; and
   (iv) about 20 to about 35 percent by weight based on (b) of organic halide.

8. A composition as in claims 1, 5 or 6 wherein said composition effective for imparting flame resistance comprises:
   (i) about 25 to about 30 percent by weight based on (b) of diphenylsilanediol, low molecular weight phenyl substituted siloxane diol or mixture thereof;
   (ii) about 8 to about 12 percent by weight based on (b) of Group IIA metal carboxylic acid salt;
   (iii) about 35 to about 40 percent by weight based on (b) of aluminum trihydrate; and (iv) about 25 to about 30 percent by weight based on (b) of organic halide.

9. A composition as in claim 1 wherein (b)(i) is selected from the group consisting of diphenylsilanediol, 1,1,3,3-tetraphenyldisiloxanediol and 1,1,3,3,5,5-hexaphenyltrisiloxanediol.

10. A composition as in claim 7 wherein (b)(i) is selected from the group consisting of diphenylsilanediol, 1,1,3,3-tetraphenyldisiloxanediol and 1,1,3,3,5,5-hexaphenyltrisiloxanediol.

11. A composition as in claim 8 wherein (b)(i) is selected from the group consisting of diphenylsilanediol, 1,1,3,3-tetraphenyldisiloxanediol and 1,1,3,3,5,5-hexaphenyltrisiloxanediol.

12. A composition as in claim 1 wherein said (b)(ii) Group IIA metal carboxylic acid salt is magnesium stearate.

13. A composition as in claim 7 wherein said (b)(ii) Group IIA metal carboxylic acid salt is magnesium stearate.

14. A composition as in claim 8 wherein said (b)(ii) Group IIA metal carboxylic acid salt is magnesium stearate.

15. A composition as in claim 1 wherein said (b)(iv) organic halide is decabromodiphenyl oxide.

16. A composition as in claim 7 wherein said (b)(iv) organic halide is decabromodiphenyl oxide.

17. A composition as in claim 8 wherein said (b)(iv) organic halide is decabromodiphenyl oxide.

18. A composition as in claim 1 wherein (b)(i) is selected from the group consisting of diphenylsilanediol, 1,1,3,3-tetraphenyldisiloxanediol and 1,1,3,3,5,5-hexaphenyltrisiloxanediol; (b)(ii) is magnesium stearate; and (b)(iv) decabromodiphenyl oxide.

19. A composition as in claim 7 wherein (b)(i) is selected from the group consisting of diphenylsilanediol, 1,1,3,3-tetraphenyldisiloxanediol and 1,1,3,3,5,5-hexaphenyltrisiloxanediol; (b)(ii) is magnesium stearate; and (b)(iv) is decabromodiphenyl oxide.

20. A composition as in claim 8 wherein (b)(i) is selected from the group consisting of diphenylsilanediol, 1,1,3,3-tetraphenyldisiloxanediol and 1,1,3,3-hexaphenyltrisiloxanediol; (b)(ii) is magnesium stearate; and (b)(iv) is decabromodiphenyl oxide.

21. A process for providing a flame retardant composition comprising combining:
(a) about 50 to about 90 percent by weight of one or more nylon materials, and
(b) about 10 to about 50 percent by weight of a composition effective for imparting flame resistance comprising:
   (i) about 20 to about 75 percent by weight based on (b) of diphenylsilanediol, low molecular weight phenyl substituted siloxane diol or mixture thereof;
   (ii) about 3 to about 30 percent by weight based on (b) of Group IIA metal carboxylic acid salt;
   (iii) about 10 to about 60 percent by weight based on (b) aluminum trihydrate; and
   (iv) about 10 to about 50 percent by weight based on (b) of organic halide.

22. A process as in claim 21 wherein said nylon material is nylon-6, nylon-6,6, nylon-6,10, nylon-11, nylon-12 or mixture thereof.

23. A process as in claim 21 wherein there is present about 55 to about 75 percent by weight of said one or more nylon materials and about 25 to about 45 percent by weight of said composition effective for imparting flame resistance.

24. A process as in claim 21 wherein there is pres( about 60 to about 65 percent by weight of said one more nylon materials and about 35 to about 40 perc( by weight of said composition effective for imparti flame resistance.

25. A process as in claims 21, 23 or 24 wherein s; composition effective for imparting flame resistar comprises:
(i) about 20 to about 45 percent by weight based (b) of diphenylsilanediol, low molecular wei̥ phenyl substituted siloxane diol or mixture there
(ii) about 5 to about 15 percent by weight based on of Group IIA metal carboxylic acid salt;
(iii) about 30 to about 45 percent by weight based (b) aluminum trihydrate; and
(iv) about 20 to about 35 percent by weight based (b) of organic halide.

26. A process as in claims 21, 23 or 24 wherein s; composition effective for imparting flame resistar comprises:
(i) about 25 to about 30 percent by weight based on of diphenylsilanediol, low molecular weight phei substituted siloxane diol or mixture thereof;
(ii) about 8 to about 12 percent by weight based on of Group IIA metal carboxylic acid salt;
(iii) about 35 to about 40 percent by weight based (b) aluminum trihydrate; and
(iv) about 25 to about 30 percent by weight based (b) of organic halide.

27. A process as in claim 21 further comprising mo ing said flame retardant composition.

28. A process as in claim 21 further comprising truding flame retardant composition.

29. A process as in claim 21 further comprising cc ing said flame retardant composition on a substrate.

30. A composition effective for improving the fla retardant properties of nylon materials comprising:
(a) about 20 to about 75 percent by weight based on of diphenylsilanediol, low molecular weight phe substituted siloxane diol or mixture thereof;
(b) about 3 to about 30 percent by weight based on of Group IIA metal carboxylic acid salt;
(c) about 10 to about 60 percent by weight of alumin trihydrate; and
(d) about 10 to about 50 percent by weight of orga halide.

31. A composition as in claim 30 comprising:
(a) about 25 to about 45 percent by weight of dipher silanediol, low molecular weight phenyl substitu siloxane diol or mixture thereof;
(b) about 5 to about 15 percent by weight of Group ] metal carboxylic acid salt;
(c) about 30 to about 45 percent by weight of alumin trihydrate; and
(d) about 20 to about 35 percent by weight of orgɛ halide.

32. A composition as in claim 30 comprising:
(a) about 25 to about 30 percent by weight of dipher silanediol, low molecular weight phenyl substitu siloxane diol or mixture thereof;
(b) about 8 to about 12 percent by weight of Group metal carboxylic acid salt;
(c) about 35 to about 40 percent by weight of alumir trihydrate; and
(d) about 25 to about 30 percent by weight of orgɛ halide.

33. A composition as in claims 30, 31, or 32 whe
(a) is selected from the group consisting of diphe ilanediol, 1,1,3,3-tetraphenyldisiloxanediol and 1,3,3,5,5-hexaphenyltrisiloxanediol.

34. A composition as in claims 30, 31, or 32 wherein aid Group IIA metal carboxylic acid salt is magnesium tearate.

35. A composition as in claims 30, 31, or 32 wherein aid organic halide is decabromodiphenyl oxide.

36. A composition as in claims 30, 31, or 32 wherein a) is selected from the group consisting of diphenylilanediol, 1,1,3,3-tetraphenyldisiloxanediol and ,1,3,3,5,5-hexaphenyltrisiloxanediol; (b) is magnesium tearate; and (d) is decabromodiphenyl oxide.

37. A process for providing a composition effective or rendering nylon flame retardant, comprising combining:
a) about 20 to about 75 percent by weight of diphenylsilanediol, low molecular weight phenyl substituted siloxane diol or mixture thereof;
b) about 3 to about 30 percent by weight of Group IIA metal carboxylic acid salt;
c) about 10 to about 60 percent by weight of aluminum trihydrate; and
d) about 10 to about 50 percent by weight of organic halide.

38. A process as in claim 37 comprising combining:
a) about 25 to about 45 percent by weight of diphenylsilanediol, low molecular weight phenyl substituted siloxane diol or mixture thereof;
(b) about 5 to about 15 percent by weight of Group IIA metal carboxylic acid salt;
(c) about 30 to about 45 percent by weight of aluminum trihydrate; and
(d) about 20 to about 35 percent by weight of organic halide.

39. A process as in claim 37 comprising:
(a) about 25 to about 30 percent by weight of diphenylsilanediol, low molecular weight phenyl substituted siloxane diol or mixture thereof;
(b) about 8 to about 12 percent by weight of Group IIA metal carboxylic acid salt;
(c) about 35 to about 40 percent by weight of aluminum trihydrate; and
(d) about 25 to about 30 percent by weight of organic halide.

40. A process as in claims 37, 38, or 39 wherein (a) is selected from the group consisting of diphenylsilanediol, 1,1,3,3-tetraphenyldisiloxanediol and 1,1,3,3,5,5-hexaphenyltrisiloxanediol.

41. A process as in claims 37, 38, or 39 wherein said Group IIA metal carboxylic acid salt is magnesium stearate.

42. A process as in claims 37, 38, or 39 wherein said organic halide is decabromodiphenyl oxide.

43. A process as in claims 37, 38, or 39 wherein (a) is selected from the group consisting of diphenylsilanediol, 1,1,3,3-tetraphenyldisiloxanediol and 1,1,3,3,5,5-hexaphenyltrisiloxanediol; (b) is magnesium stearate; and (d) is decabromodiphenyl oxide.

* * * * *